(12) United States Patent
Schwartz

(10) Patent No.: US 11,676,306 B1
(45) Date of Patent: Jun. 13, 2023

(54) ENHANCING AND MAPPING THE MULTI-DIMENTIONAL COLOR DIFFERENTIATION OF INTRINSIC IMAGES

(71) Applicant: Center for Quantitative Cytometry, San Juan, PR (US)

(72) Inventor: Abraham Schwartz, San Juan, PR (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 18/052,913

(22) Filed: Nov. 5, 2022

(51) Int. Cl.
G06T 7/80 (2017.01)
G06T 5/00 (2006.01)
H04N 23/73 (2023.01)

(52) U.S. Cl.
CPC .............. G06T 7/80 (2017.01); G06T 5/009 (2013.01); H04N 23/73 (2023.01); *G06T 2207/30024* (2013.01)

(58) Field of Classification Search
CPC . G06T 7/80; G06T 5/009; G06T 2207/30024; H04N 23/73
See application file for complete search history.

(56) References Cited

U.S. PATENT DOCUMENTS

| 9,435,687 | B1* | 9/2016 | Schwartz | G01J 3/0297 |
| 10,652,484 | B1* | 5/2020 | Schwartz | H04N 23/11 |
| 10,969,523 | B1* | 4/2021 | Schwartz | G02B 5/0252 |
| 2008/0046217 | A1* | 2/2008 | Polonskiy | G01N 21/25 |
| | | | | 702/179 |
| 2012/0327248 | A1* | 12/2012 | Tack | H04N 23/11 |
| | | | | 348/262 |
| 2013/0083312 | A1* | 4/2013 | Baraniuk | G01J 3/0229 |
| | | | | 356/402 |
| 2014/0085629 | A1* | 3/2014 | Bodkin | G01J 3/2823 |
| | | | | 356/300 |
| 2017/0016768 | A1* | 1/2017 | Golub | H04N 23/00 |
| 2018/0020129 | A1* | 1/2018 | Schwartz | G06T 5/002 |

\* cited by examiner

*Primary Examiner* — Molly Wilburn
(74) *Attorney, Agent, or Firm* — Hoglund & Pamias, PSC; Roberto J. Rios

(57) ABSTRACT

An array (map) of intrinsic images of an image of interest is established by selecting the intensities of a focused and defocused/diffused images of the image of interest. After obtaining a first focused image, a series of defocused/diffused images are obtained at different exposure times, where intrinsic images are obtained from the first focused image and the series of defocused/diffused images in order to form an array of image sets of the intrinsic images in the form of a matrix. In addition, a second focused image can be obtained at a different exposure time than the first focused image, and a second series defocused/diffused images are obtained at different exposure times, where second intrinsic images are obtained from the second focused image and the second series of defocused/diffused images in order to form an array of image sets of the intrinsic images and the second intrinsic images in the form of a matrix. The array of image sets cover and shows the required granularity of intrinsic differences among the intrinsic images generated enhancing the intrinsic images resulting in more noticeable details of the intrinsic image and the image of interest not previously appreciated.

12 Claims, 12 Drawing Sheets
(12 of 12 Drawing Sheet(s) Filed in Color)

Focused Images

Intrinsic Images

Focused Images

Intrinsic Images

Focused Images at Different Illumination Intensities

Increasing Illumination of the Focused Image ⟶

Focused Images at the same Illumination Intensities

ENHANCING AND MAPPING THE MULTI-DIMENTIONAL COLOR DIFFERENTIATION OF INTRINSIC IMAGES

TECHNICAL FIELD

The invention relates to a method of obtaining images that enhance and map intrinsic images by eliminating selective portions of illumination without the use of spectral filters or dichroic mirrors.

BACKGROUND OF THE INVENTION

The theory of Intrinsic processing eliminates all irrelevant spectral components from spectra. This is accomplished, as detailed in U.S. Pat. No. 9,435,687 B1 (incorporated herein by reference in its entirety), by first subtracting the reference components from the sample components of an empty cuvettes to obtain the small wavelength by wavelength differences between the sample and reference components. This result is referred to as the Residual spectrum. The Residual spectrum is the differences between the reference and sample is caused by the in the instrument. The Intrinsic theory requires the Residual spectrum to be added to the reference spectrum, and that sum subtracted from the sample spectrum producing a Zero Order Spectrum. Conceptually, this can be considered as, the number 6 representing the sample spectrum, number 4 representing the reference spectrum, and the number 2 representing the Residual spectrum. Thus, 6−4=2; 4+2=6; and 6−6=0, the Zero Order Spectrum. This validates that all irrelevant spectral components have been completely removed when the cuvettes are empty.

The general theory and methodology of intrinsic imaging is presented in U.S. Pat. No. 10,652,484 B1 and 10,969,523 B1 (incorporated herein by reference in their entireties) where methods to remove the illumination from a focused image of a field of view are described by subtracting a defocused/diffused image of the same field of view pixel by pixel of the focused image. The Advanced methodology that requires the determination of the residual image to add to the diffused image to obtain a Zero Order Image validating that all irrelevant spectral components have eliminated from the image.

As explained in U.S. Pat. No. 10,969,523 B1, the diffused image can be obtained by placing a translucent material in the path between the camera and field of view. In a preferred embodiment, the translucent material is made of polyethylene or polyvinyl chloride but other equivalent materials can be used as long as the material complies with the criteria explained below. The translucent material permits transmission of the illumination energy while diffusing the spatial details of the field of view, thus producing a featureless image of illumination intensities without discernible spatial features in the field of view. It is important that the diffused image of the same field of view preserves the characteristics of the illumination, for example, intensity gradients being the same as those of the focused image. The criteria of the translucent material necessary to produce a useful or optimal diffused image according to the present invention are:

1. The translucent material must pass all wavelengths of the illumination.
2. The resulting diffused image must not contain any spatial features of the focused image.
3. The diffused image must have the same illumination intensity distribution as the focused image, i.e., the same intensity gradient.
4. The translucent material must pass the illumination wavelength range proportionally, i.e., must not adsorb or emit disproportionately e.g., the translucent material must not have fluorescent properties.

Alternatively, as explained in U.S. Pat. No. 10,652,484 B1, a defocused image can be obtained for example using a digital imaging device such as a Canon T2i DSLR camera, where the end stop of the manual focus train is selected as the defocused setting. However, it is envisioned that other settings or techniques can be used as long as a featureless image of illumination intensities without discernible spatial features in the field of view is obtained.

In these above-explained patents, a Simplified mode of intrinsic theory is presented where the Residual spectral data is not considered when processing images that produces imperfect intrinsic images since the Residual is still a component in the intrinsic image.

To determine if an image is improved is generally based on criteria of contrast, resolution, and color differentiation. The contrast considers for changes of intensity of a specific color. Resolution is defined formally as the shortest distance distinguishable between two points in an image. A less formal definition considers increased sharpness of edge boarders of objects within an image. Color differentiation is the ability to enhance color differences between objects within an image.

A representative example of these criteria presents itself in the field of histopathology where biological tissues are stained with hematoxylin and eosin dyes, H&E. These dyes have the potential to reveal complex characteristics since each dye has both reflective and fluorescence properties. However, the illumination in a microscope tends to overpower the fluorescence emission of these dyes. The importance and limitation with these stains is succinctly stated by Gibbs, et. al. (Summer L. Gibbs, et. al., Molecular Imaging 2015: pp 1-9): *"Hematoxylin-eosin (H&E) staining of tissue has been the mainstay of pathology for more than a century. However, the learning curve for H&E tissue interpretation is long, whereas intra- and interobserver variability remain high. Computer-assisted image analysis of H&E sections holds promise for increased throughput and decreased variability but has yet to demonstrate significant improvement in diagnostic accuracy."*

This long learning curve may be due to the limited color differentiation produced by these stains, i.e., purple staining for nucleic acids and pink staining for proteins. However, the complex spectral properties of these dyes strongly suggest the possibility of increased color differentiation if there was a way to enhance such differentiation.

SUMMARY OF THE INVENTION

When applying the Simple mode intrinsic processing, the Residual spectral component is the differences in the portion of illumination still contained in the intrinsic image due to defocused/diffused condition when obtaining the images.

According to an aspect of the invention, the Residual is manipulated by adjustments in the exposure settings of the focused and defocused/diffused images that will reveal specific aspects in the resulting intrinsic image. These exposure adjustments to the focused and/or the defocused/diffused images have limited effect on those individual images, respectively, (i.e., showing only small differences in the intensity of the images). However, the effect on the resulting contrasts and color pallets of the intrinsic images are significant due to the subtraction of the defocused/diffused image from the focused image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Generally, digital images are enhanced by modifying the pixels through post-facto software manipulation. These manipulations, 1) affect contrast by stretching, logarithmic, gamma and subjective variable curve applications, 2) affect sharpness, by mathematical deconvolution, and 3) change color pallets by saturation and subjective color shifting. All these manipulations are based on subjective software adjustments to produce an image based on a preconceived notion of a field of view.

In clear contrast, an important aspect of the present invention is that the color pallets of intrinsic images are manipulated by the exposure parameters for the focused and defocused/diffused images, and not on post subjective software manipulations. The color appearance of objects in a field of view of an intrinsic image cannot easily be predicted without knowledge of the intrinsic spectral nature of the objects.

Thus, an array of image sets is required, focused and defocused/diffused images, are obtained under the same illumination and foreground conditions. The exposure parameters of a camera are the only variables used and controlled when obtaining an array of images to produce an intrinsic map. Relatively small manipulations of these exposure parameters for either or both the focused and diffused images will significantly modify the contrast, resolution, and color differentiation of the processed image. These exposure parameters include the exposure period, the F-stop, and the ISO sensitivity value. The digital manipulation of the illumination intensity can be considered if reproducible when imaging with an instrument having a built-in light source, however analog adjustments do not lend themselves to reproducibility.

As previously explained, an important feature of the present invention is that no software processing or manipulations are made other than as described in the simple methodology where the diffused/defocused image is subtracted pixel by pixel from the focused image, as explained in U.S. Pat. Nos. 10,652,484 B1 and 10,969,523 B1.

Figure 1:
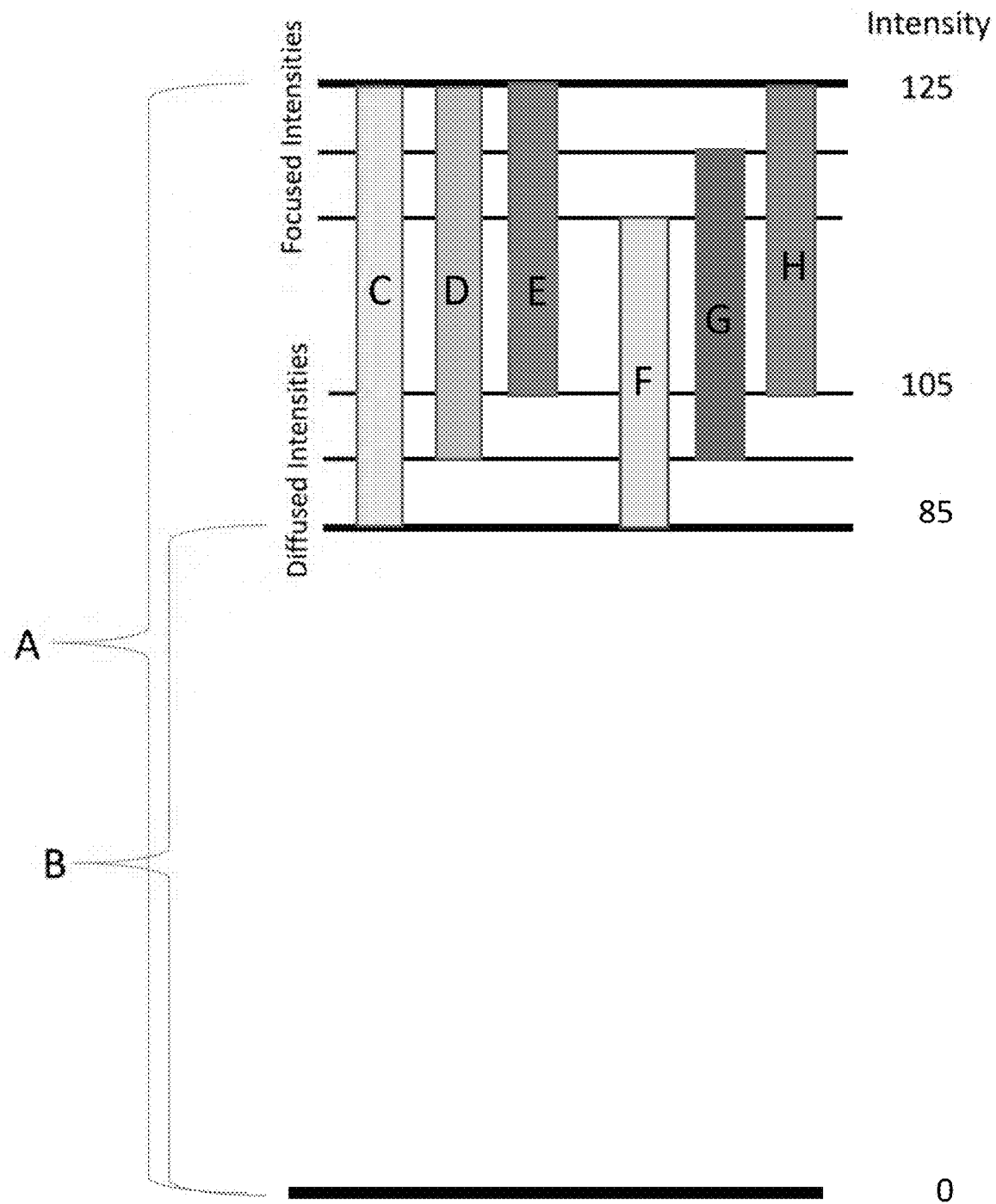
FIG. 1 shows an illustration of the relative ranges between specific intensity levels of focused and defocused/diffused images. The A-range indicates the intensity range of the initial focused image. The B-range indicates the intensity of the initial defocused/diffused image. The C, D, E-ranges indicates the intensity of the residuals when the defocused/diffused exposure periods are increased stepwise relative to the initial fixed focused intensity resulting in stepwise darkening of the processed intrinsic images. The F, G, H-ranges of the residual are equal since reducing the exposure period of the focused image, reduces both the focused and the defocused/diffused intensities. This results in shifting the background of the color pallet, from yellow, to green to blue.

The sensitivity of the color differentiation in the present invention is achieved by manipulations of the exposures that have a significant effect on the small intensity range of the residual, as compared to the larger intensity ranges of the focused and defocused/diffused images. For example, as shown in FIG. 1, the intensity of the initial focused image is 125 and the intensity of the initial diffused image is 85. This is a residual intensity of 40, represented by the bar labeled C in FIG. 1. Now if the diffused intensity is increased to 105, then the residual intensity is reduced to 20, represented by the bar labeled E in FIG. 1. The intensity between the two diffused values was changed by only 16% relative to the initial focused intensity of 125. However, the intensity between the two residuals was 50%, relative to the initial residual of 40. Therefore, a key aspect of the invention is that even small differences in the exposure parameters of the defocused/diffused image provide the necessary sensitivity of the inventive processing to obtain enhancement of the intrinsic image resulting in more noticeable details of the intrinsic image and the image of interest not previously appreciated.

An array (map) of intrinsic images is established by selecting the intensities of both the focused and defocused/diffused images. After obtaining the first focused image, a series of defocused/diffused images are obtained at different exposures. Then, a second focused image is obtained at a different exposure from the first focused image, and a series defocused/diffused images is obtained at different exposures. These exposure adjustments are repeated to obtain an array of image sets, (e.g., 2×2, 3×3, 4×4 5×5, etc. . . . ), that can be processed to cover and obtain the required granularity of intrinsic differences.

According to a preferred embodiment of the invention, the plural focused images with their corresponding defocused/diffused images at different exposures are obtained to form an array of image sets in the form of a matrix with multiple columns and rows (as explained above). However, it is also envisioned that only a first focused image and a series of defocused/diffused images at different exposures can be obtained in order to form an array of image sets in the form of a single column matrix or a single row matrix (e.g., 1×2, 1×3, 2×1 3×1, etc. . . . ).

The following examples and Figures will demonstrate the method of the present invention.

Exposure Control

Figure 2A:
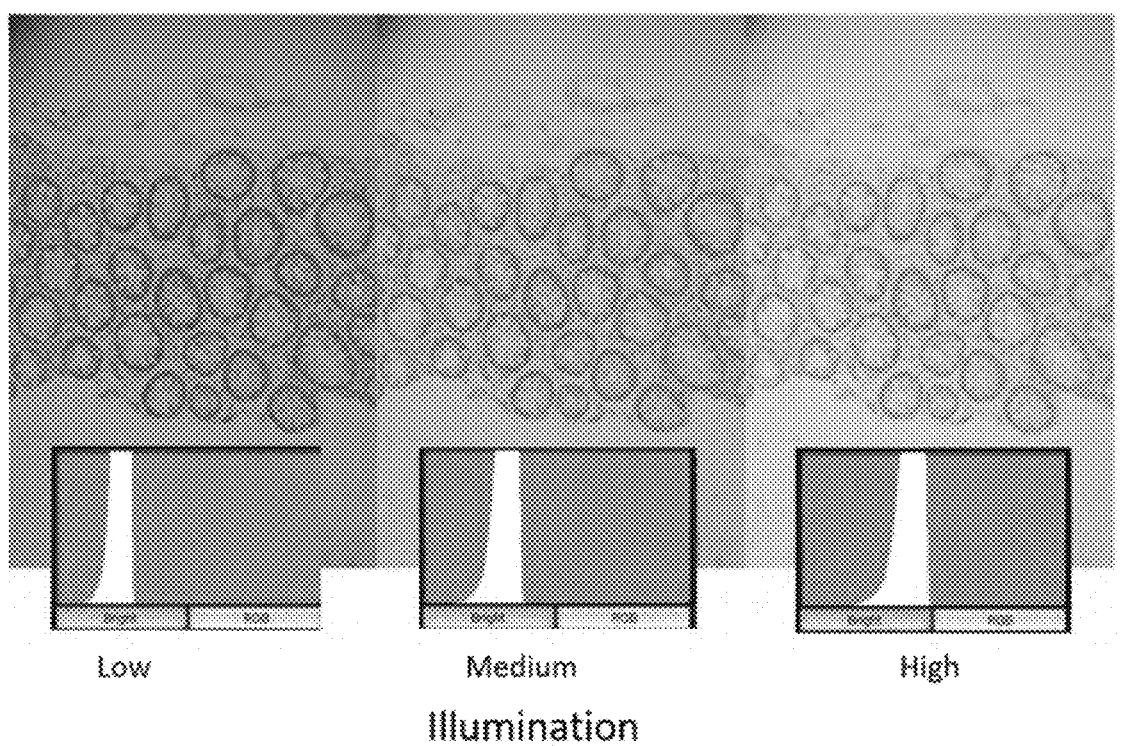
FIGS. 2A and 2B show focused images with corresponding intrinsic images of sample tissues including histograms where the exposure intensity peaks can be determined.
Figure 2A:
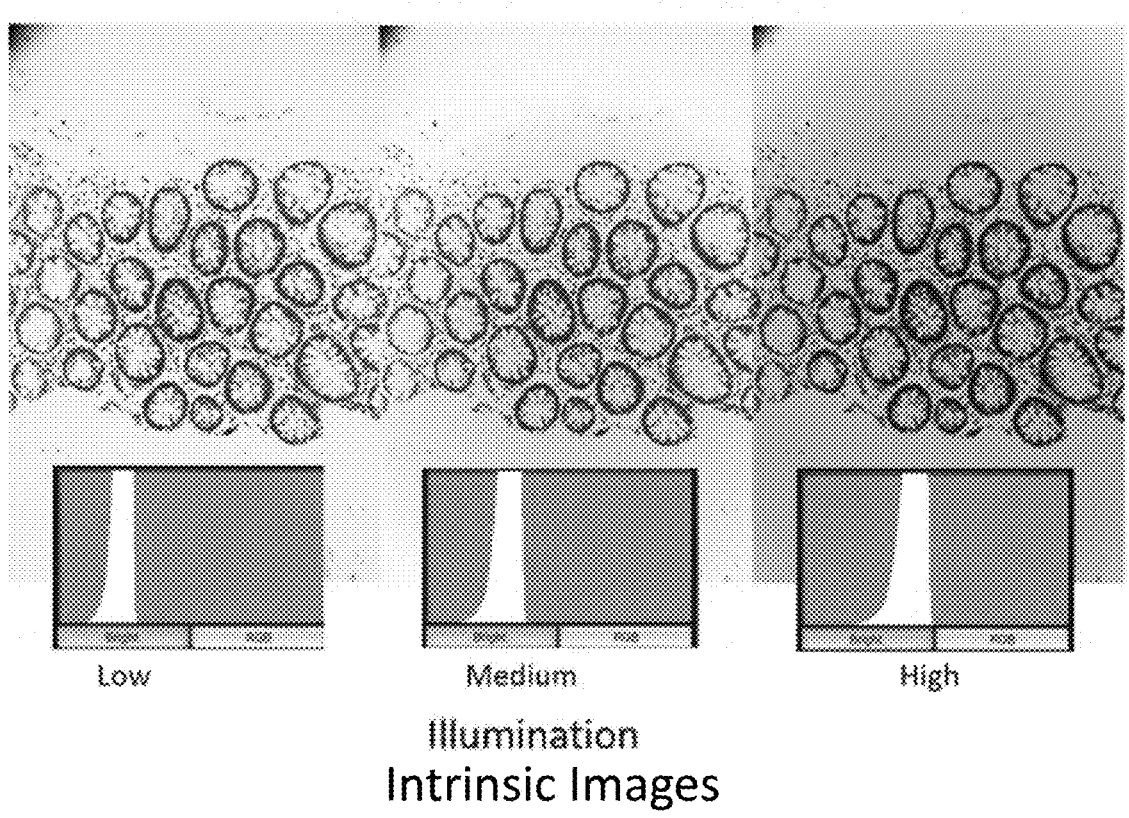
Figure 2B:
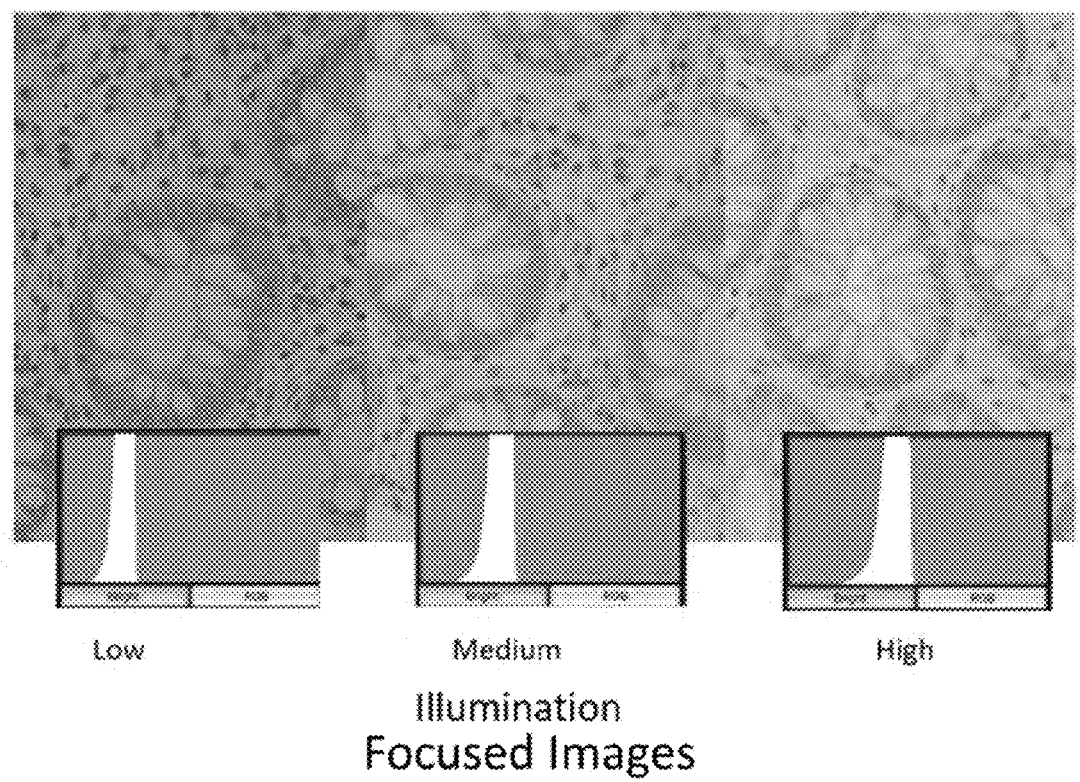
Figure 2B:
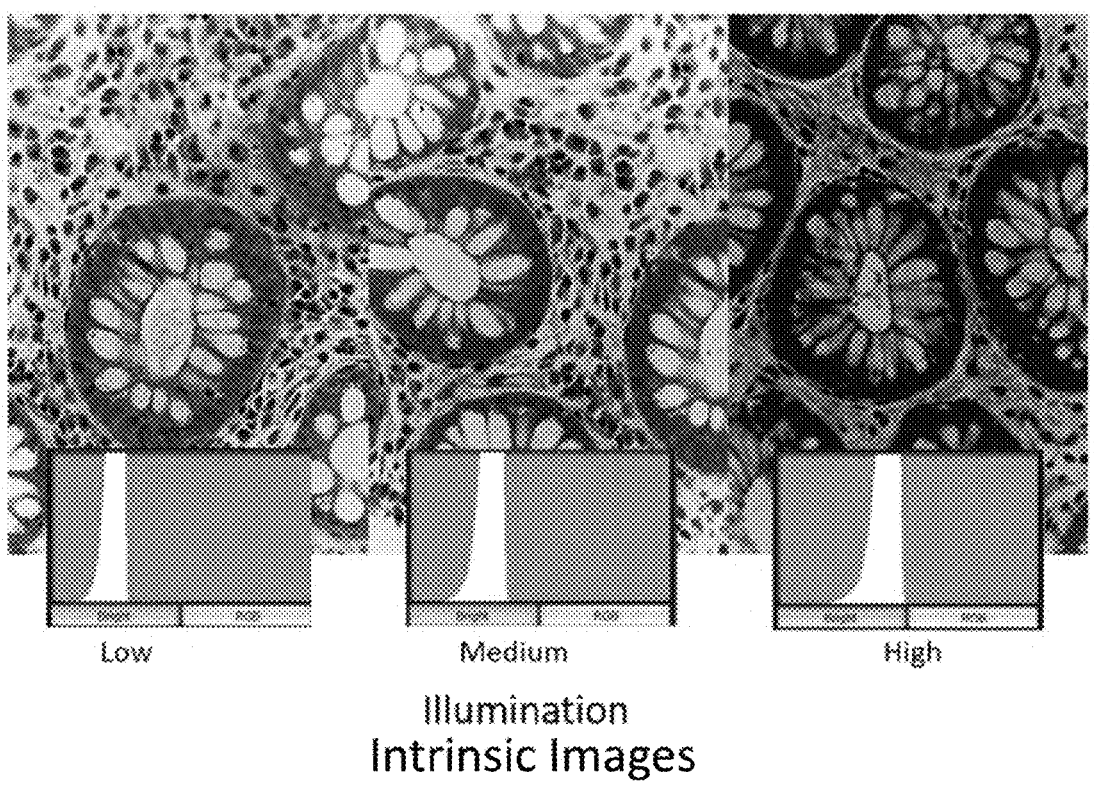

The most basic form of exposure parameters control is the initial setting of the focused image. This can be indicated by the leading edge, i.e., highest value of the intensity, which can be determined from example from an image histogram as shown in the images on FIGS. 2A and 2B. Once this intensity value is determined, both the focused and diffused images are obtained at this camera setting. Note that the intensity of the defocused/diffused image is lower than the focused image due to the loss of illumination through the diffusing material.

After determining the intensity of the focused image, the intensity of the diffused image is adjusted such that a residual provides specific characteristics to the resulting intrinsic image. One important aspect of the invention is that even small differences in the exposure parameters of the defocused/diffused image provide the necessary sensitivity of the inventive processing to obtain enhancement of the intrinsic image. This novel feature can be appreciated on FIGS. 2A and 2B, where small changes in exposure produce relatively small noticeable changes in the illumination of the focused images but produce intrinsic images with significant noticeable details. On the intrinsic images of FIGS. 2A and 2B, lower illumination has a yellow background bringing out intra-cellular detail of the tissue, whereas higher illumination has a blue background bringing out connective tissue details.

Then, an array (map) of intrinsic images is established by selecting the intensities of both the focused and defocused/diffused images. After obtaining the first focused image, a series of defocused/diffused images are obtained at different exposures. Then, a second focused image is obtained at a different exposure from the first focused image, and a series defocused/diffused images is obtained at different exposures. These exposure adjustments are repeated to obtain an array of image sets, e.g., 3×3, 4×4 5×5, etc., that can be processed to cover and obtain the required granularity of intrinsic differences. The following examples and Figures will demonstrate the method of the present invention.

EXAMPLES

Example 1. Manipulating the Exposure Parameters of the Focused and Diffused Image Sets A Nikon Labophot microscope using 10× objective with illumination provided by a 20 w halogen bulb was used to examine a H&E-stained sample of tonsil tissue. An Orion filter wheel fitted with a spectrally neutral diffusing material was placed between the Canon t2i EROS camera and the optics of the microscope. The microscope imaging was remotely controlled by EROS 2 utility software. Focused and diffused image sets were obtained of the H&E-stained prostate tissue at the same exposure and ISO settings.

Figure 3:
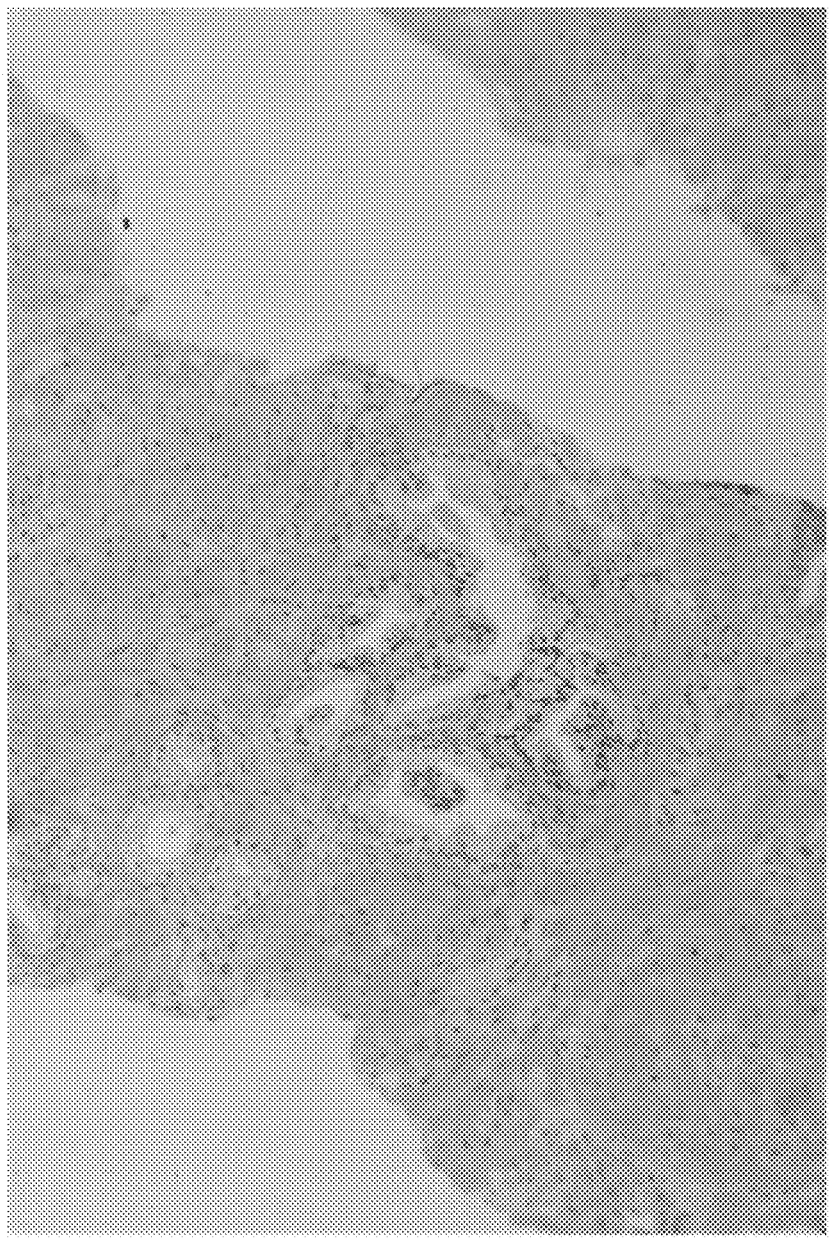
FIG. 3 shows a focused micrographs of H&E-stained prostate, where the purple stained nuclei of the cells and the pink stained protein containing tissue are shown in the image.
Figure 4:
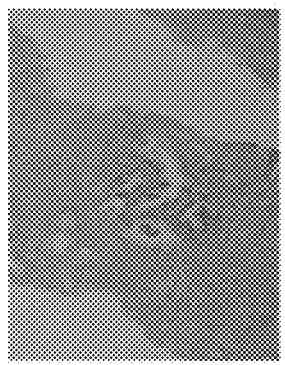
FIG. 4 shows a 3×3 micrograph array of the original focused image shown in FIG. 2 where the exposure setting for the focused images were set of ⅕, ¼, and ⅓ seconds for the images across the columns, respectively. Small increase in intensity with increasing exposure period and the exposure across each row of images across the columns being the same are shown.
Figure 4:
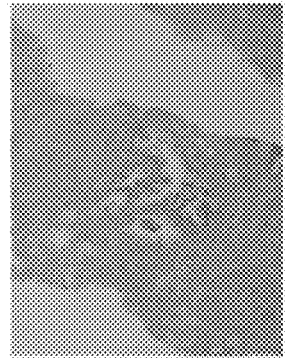
Figure 4:
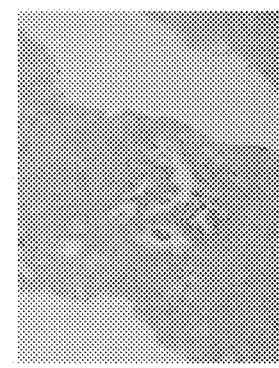
Figure 4:
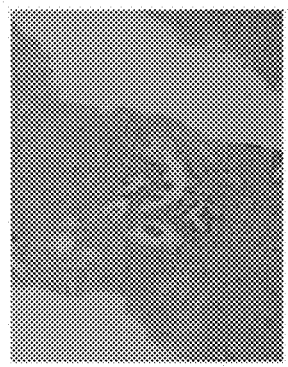
Figure 4:
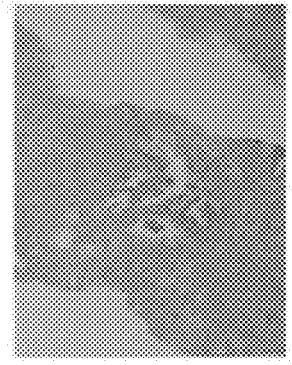
Figure 4:
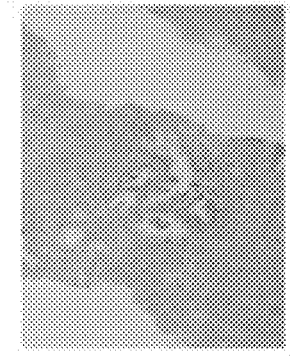
Figure 4:
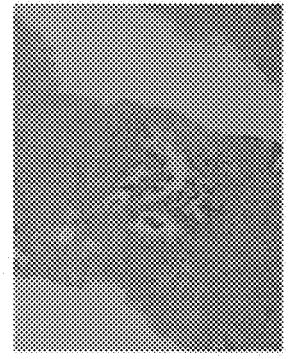
Figure 4:
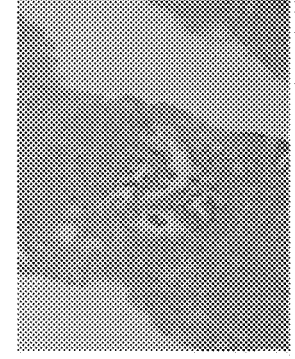
Figure 4:
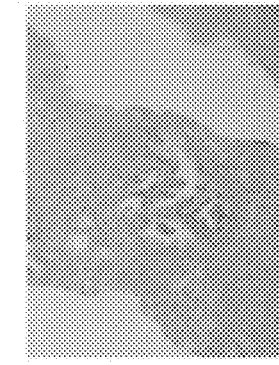
Figure 5:
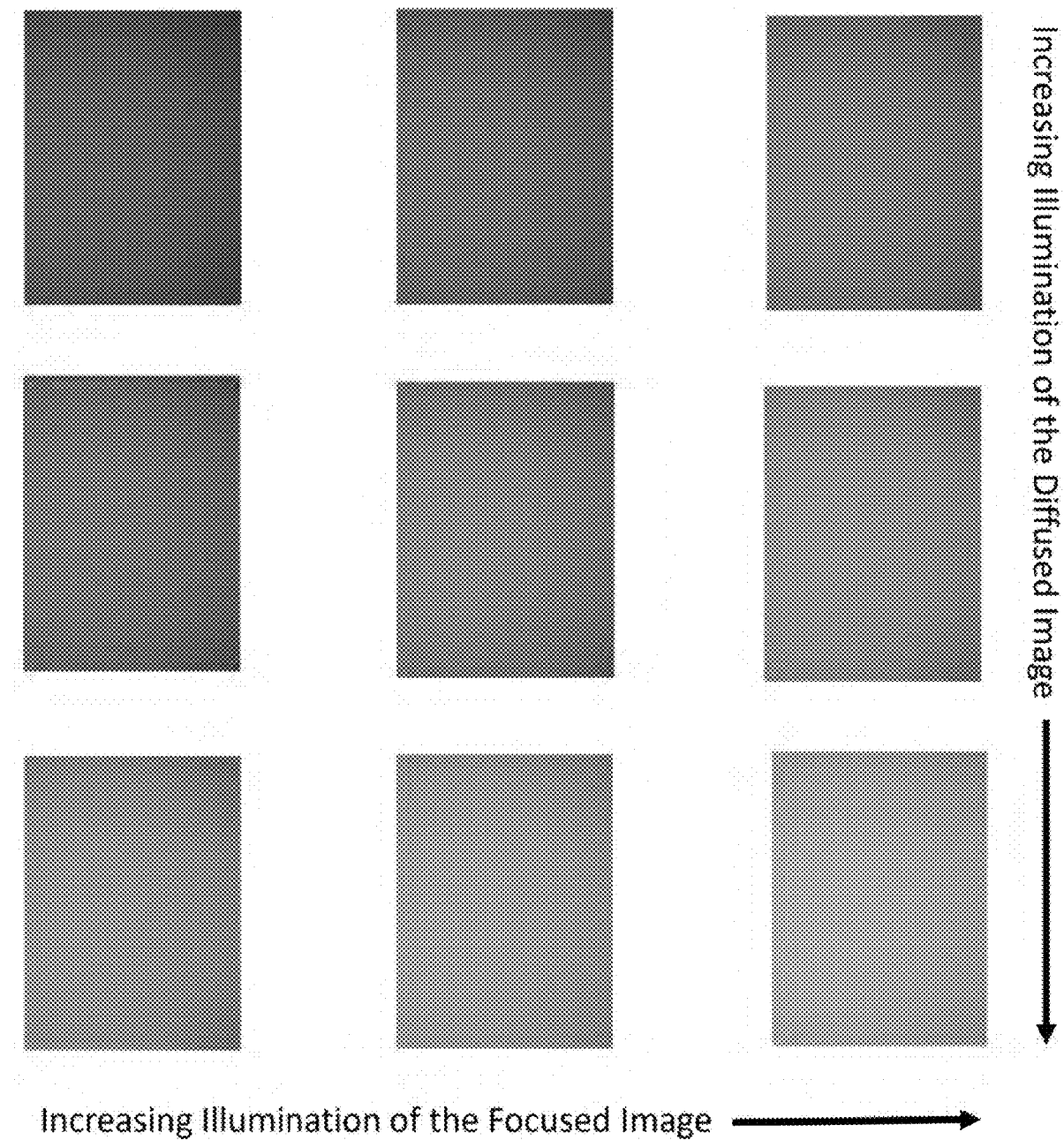
FIG. 5 shows a 3×3 micrograph array of diffused images where the exposure setting of ⅕, ¼, and ⅓ seconds across the three columns and down the rows, respectively. The increasing intensity of the diffused images go from left to right and top to bottom.
Figure 6:
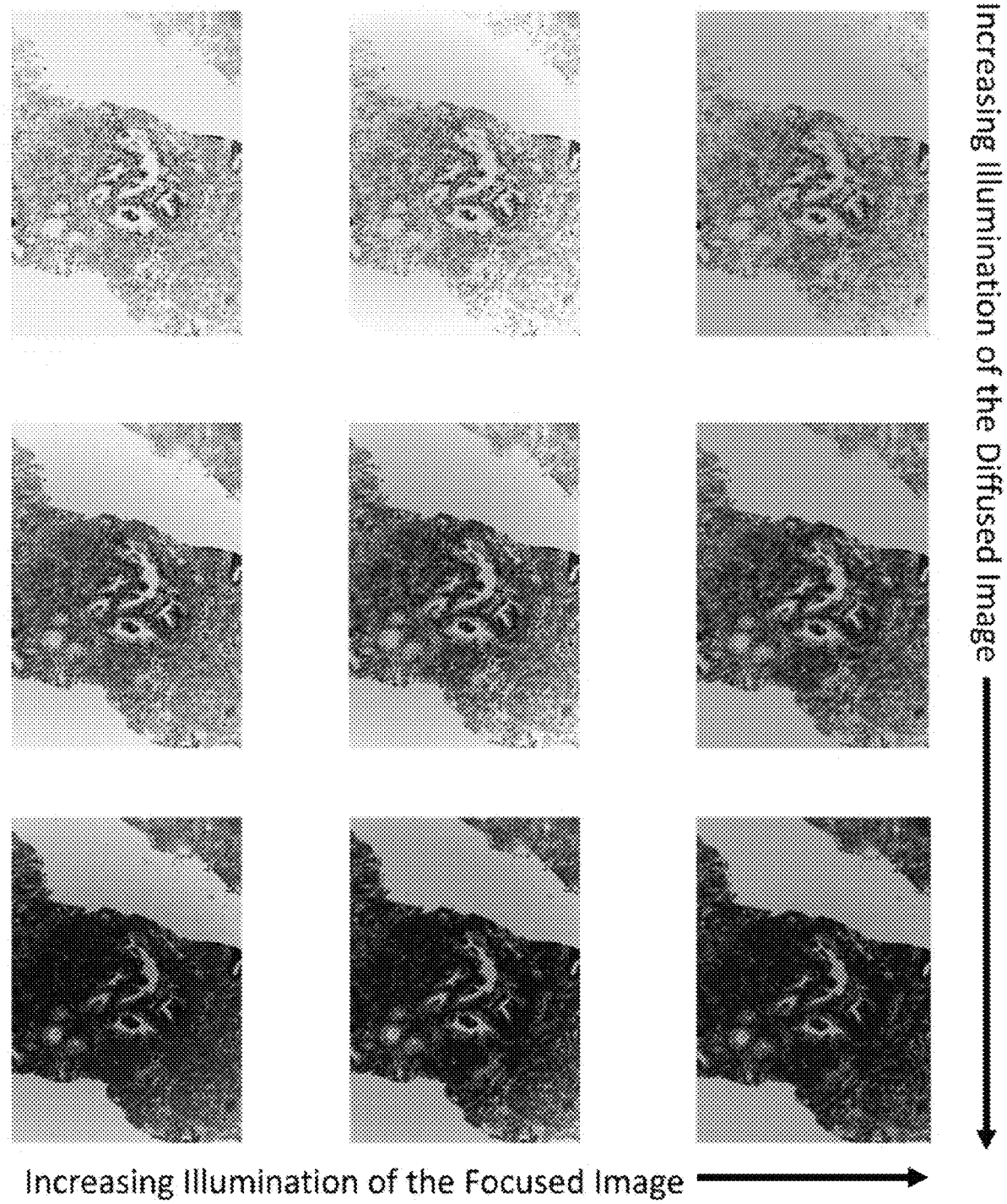
FIG. 6 shows a 3×3 micrograph map array of intrinsic images produced using the arrays of images in FIGS. 3 and 4 with the simple intrinsic processing methodology. The array of intrinsic images shows a significant shift in the color pallets, as well as greater contrast, higher resolution, and stronger color differentiation as compared to the array of the original focused images in FIG. 4.
Figure 7:
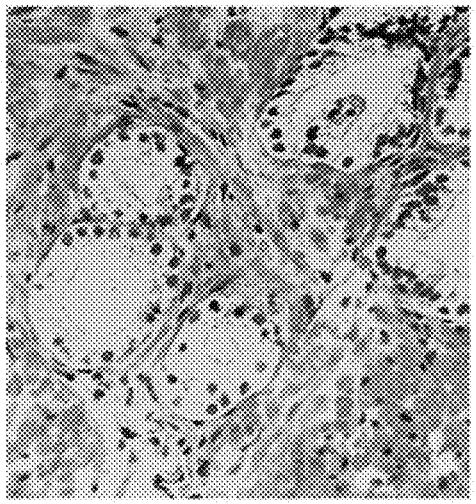
FIG. 7 shows a selected region of intrinsic micrographs in FIG. 6 showing progressive color differentiation of different areas of the tissue enhancing specific tissue features.
Figure 7:
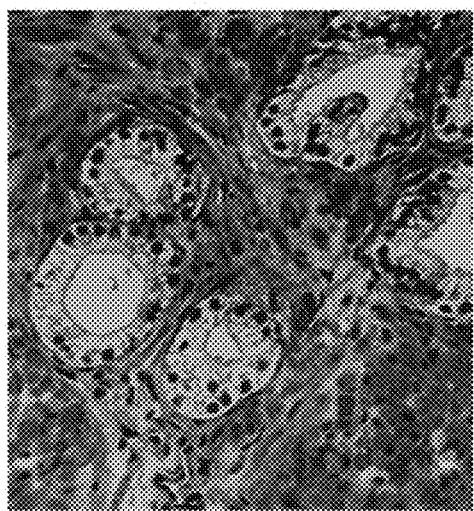
Figure 7:
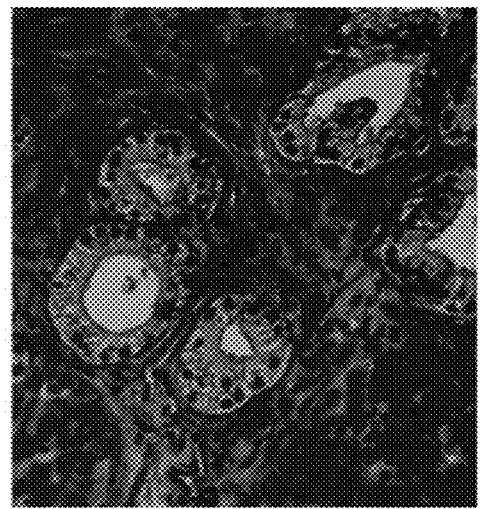

FIG. 3 shows a focused image of the tissue under investigation. The exposure time for the focused image was set at ⅕ (0.2) of a second and a series of diffused images were obtained at 0.2, 0.3 and 0.4 of a second. A second focused image was taken at 0.4 seconds, followed by a series of diffused images taken at 0.4, 0.5 and 0.6 seconds. A third focused image was taken at an exposure of 0.6 seconds, followed by a series of diffused images at 0.6, 0.8, and 1.0 seconds. An array of focused images in columns of 0.2, 0.4, and 0.6 second exposures are presented in FIG. 4. An array of diffused images in rows of 0.2, 0.4, and 0.6 second exposures, 0.4, 0.5 and 0.6 second exposures and 0.6, 0.8, and 1.0 second exposures are presented in FIG. 5. After processing the respective sets of focused and diffused images arrays according to the simple intrinsic methodology, the results are presented as an intrinsic array, i.e., 3×3 map, in FIG. 6. The intrinsic images shifted in dimensional color space and increased color differentiation. The intrinsic image processed from the low intensity had a typical yellow background revealing greater intra-cellular detail. The intrinsic image processed from the high intensity had a typical blue background showing greater detail in the protein connective tissue. This intrinsic map provided a progressive array of images varying from high to low intensity moving down the rows while providing a color shift from red to blue moving across the rows. These variations enhance different features within the field of view, where specific cellular features in a selected area of the field of view are presented in FIG. 7.

Example 2. Mapping the Intrinsic Properties of a Flower

Figure 8:
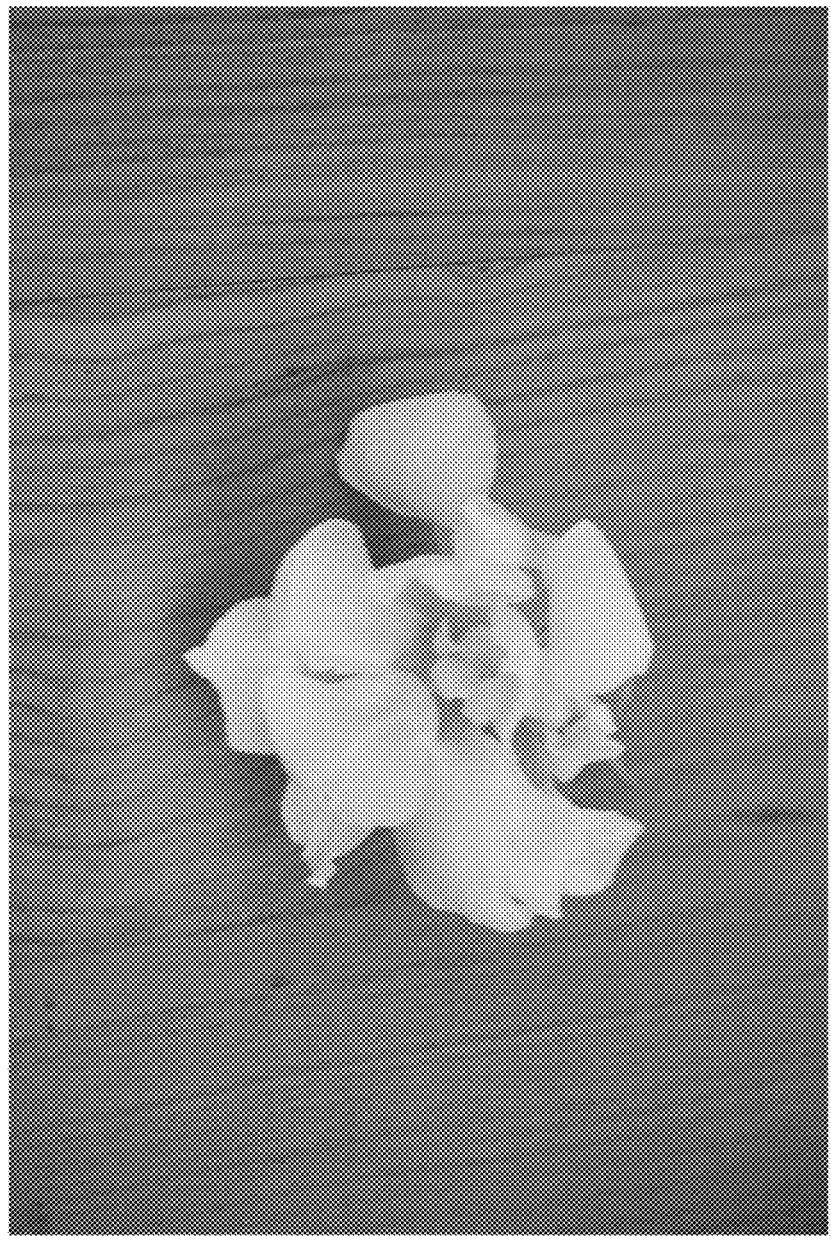
FIG. 8 shows a focused image of a flower on a wooden background under indoor ambient daylight.
Figure 9:
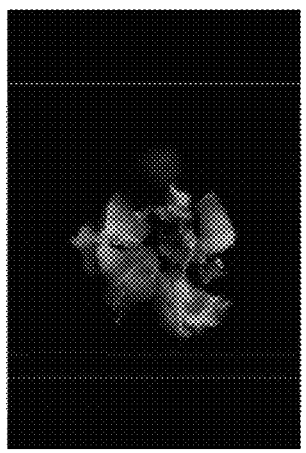
FIG. 9 shows the array of intrinsic images of the flower in FIG. 8 where the exposure periods of the focused and diffused were set over ranges of ⅙-½ of a second. The change from a red dominant to green dominant color pallet, as well as the strong light absorption of the wood background is shown.
Figure 9:
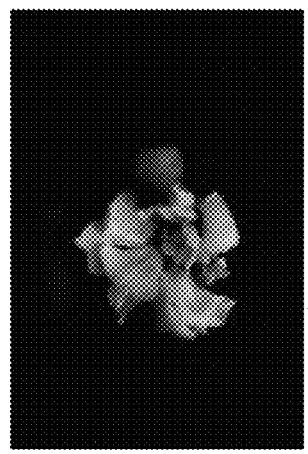
Figure 9:
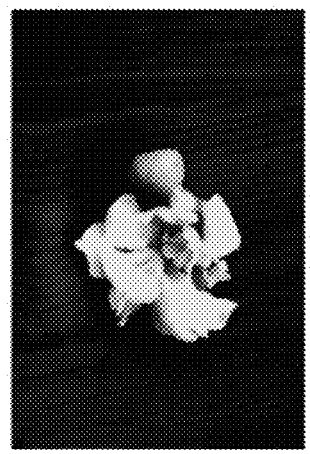
Figure 9:
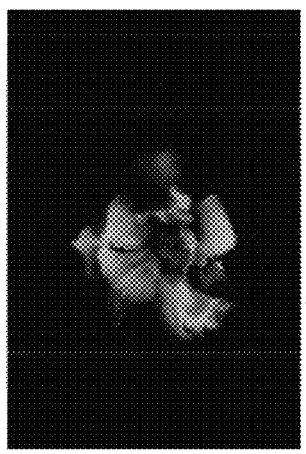
Figure 9:
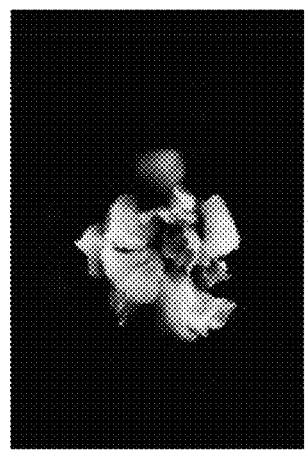
Figure 9:
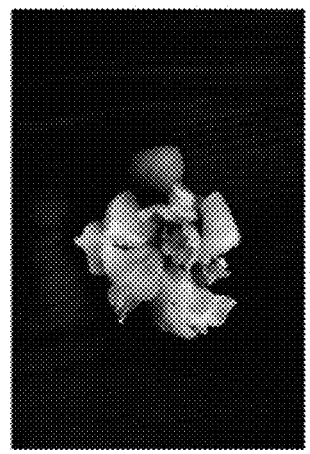
Figure 9:
Figure 9:
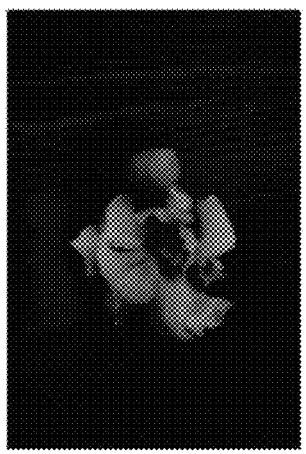
Figure 9:
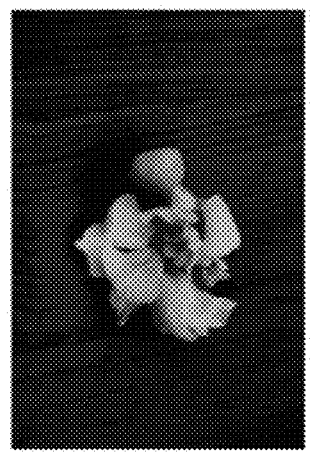

The same Canon camera, diffuse material, procedure, and processing used in the previous Example 1 was also used to create the intrinsic map of the canary flower presented as a focused image in FIG. 8. The flower was placed on a wood background in a room using ambient daylight. The images were taken at an ISO sensitivity of 200 using exposure periods ranging from 0.025, 0.075, and 0.125 seconds. The intrinsic map of this flower is presented in FIG. 9 and shows a progression of light to dark moving down the rows and a shift from red to green moving across the columns. Different features are enhanced across the map by the shift of the color pallet.

Example 3. Mapping the Intrinsic Properties of a Boulder

Figure 10:
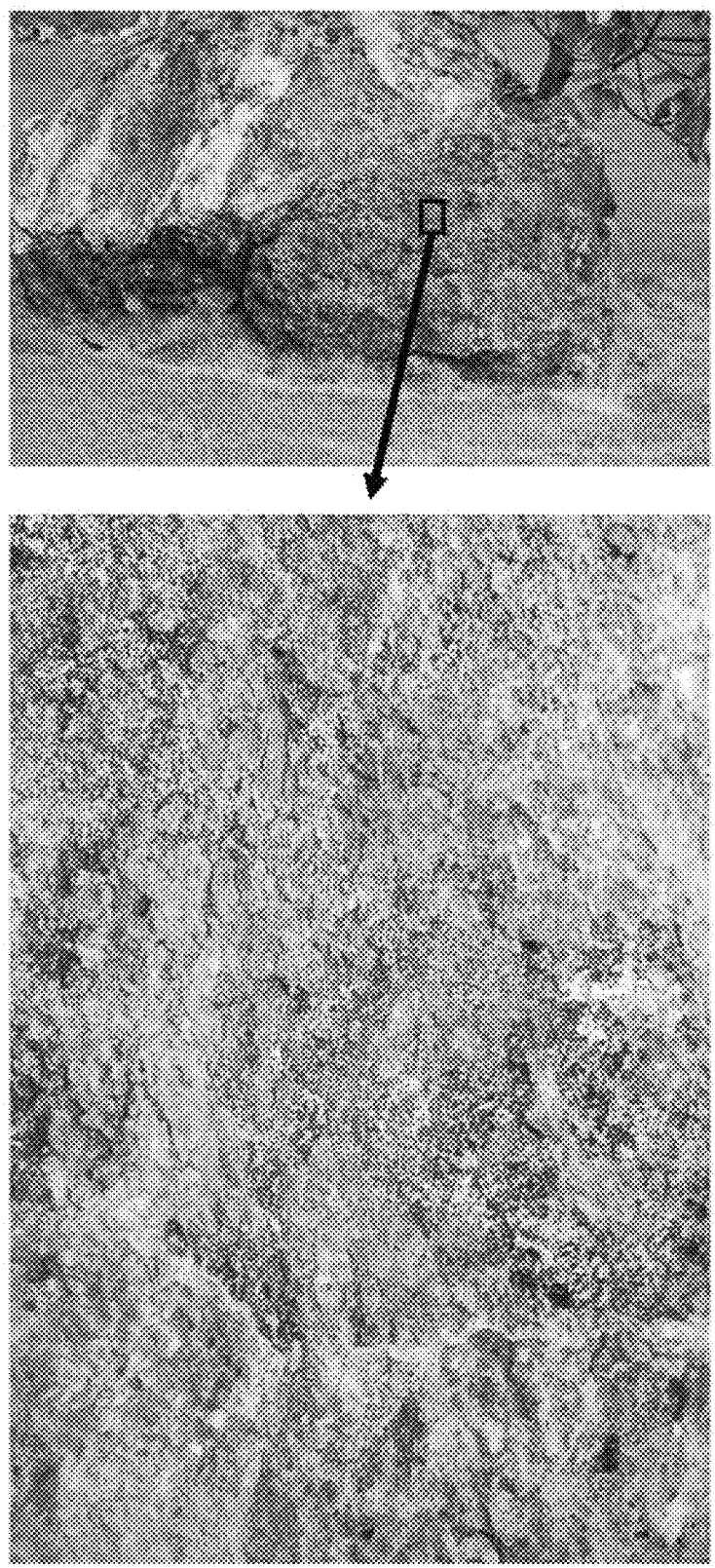
FIG. 10 shows a focused image of a section of boulder under direct sunlight.
Figure 11:
FIG. 11 shows the array of intrinsic images of the boulder in FIG. 10 where the exposure periods of the focused and diffused were set over ranges of $1/500$ to $1/80$ of a second. The change from a red dominant to a green dominant color pallet is shown.
Figure 11:
Figure 11:
Figure 11:
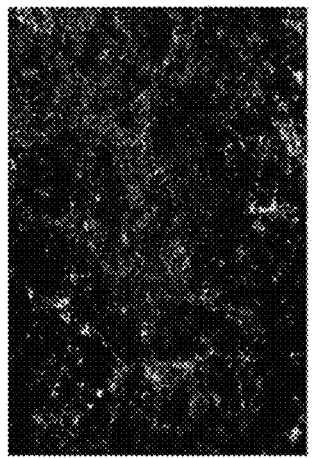
Figure 11:
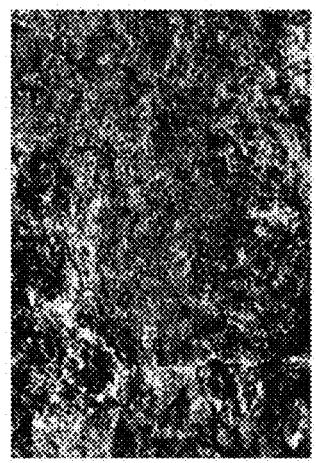
Figure 11:
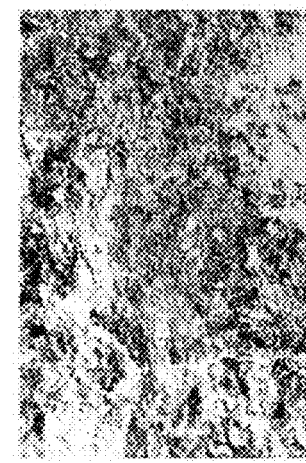
Figure 11:
Figure 11:
Figure 11:
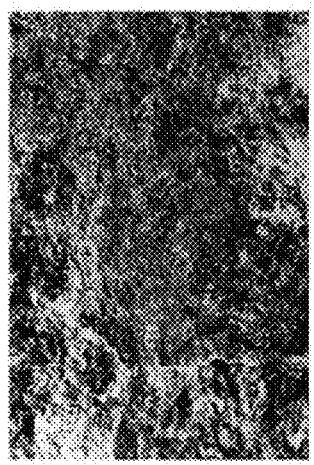

The same Canon camera, diffuse material and procedure and processing used to create the intrinsic map of the minerals in a boulder presented as a focused image in FIG. 10. The boulder was illuminated by direct sunlight. The images were taken at an ISO sensitivity of 200 with exposure periods ranging from 0.002, 0.01, and 0.05 seconds. The intrinsic map of the mineral is presented in FIG. 11 and shows a progression of light to dark moving down the rows and a shift from red to green moving across the columns. Different features are enhanced across the map by the shift of the color pallet.

When considering the criteria used to evaluate improvement of an image, color differentiation appears to have the greatest effect on both contrast and resolution, as demonstrated in these examples. Resolution, sharpness of boarders, appears to improve when examining a multi-colored pallet. For example, in the images that contain H&E-stained protein tissue, an image of a single strand of mono-chrome fiber resolves into multi-color fibers when the images are obtained and processed by the intrinsic methodology according to the present invention.

A more general case for improved resolution by intrinsic processing can be made when the original focused images appear to be out of focus when compared to the same original images after intrinsic processing. Another way of considering this focus phenomenon is that the original focused image contains a fog or blurring component. The intrinsic theory establishes that the illumination component in normal images corresponds to fog and is removed by the intrinsic processing.

Although, these examples and explanations human tissue, flowers and minerals, the application is not limited to these fields and the methodology may be applied to any field that obtains digital images. The present invention has been described herein with reference to the foregoing exemplary embodiment, however, this embodiment does not serve to limit the scope of the present invention. Accordingly, those skilled in the art to which the present invention pertains will appreciate that various modifications are possible, without departing from the technical spirit of the present invention.

The invention claimed is:

1. A method of generating an intrinsic imaging map of a view of interest, the method comprising:
    obtaining a first focused image of a view of interest at a first exposure time;
    obtaining a plurality of featureless images of illumination intensities without discernible spatial features of said field f view of interest, wherein said featureless images are obtained at different exposure times;
    generating a plurality of intrinsic images of said view of interest, wherein said plurality of intrinsic images comprises a first intrinsic image generated from said first focused image and a first featureless image of the plurality of featureless images and the rest of said intrinsic images are individually generated from said first focused image and each of the rest of said featureless images of the plurality of featureless images; and
    generating an intrinsic imaging map of said view of interest, wherein said plurality of intrinsic images are arranged and shown in the form of a matrix.

2. The method according to claim 1, wherein said first featureless image of said plurality of featureless images is obtained at said first exposure time.

3. The method according to claim 1, wherein all focused images and all featureless images are obtained at the same ISO sensitivity.

4. The method according to claim 1, wherein said featureless images comprise diffused images of said view of interest.

5. The method according to claim 1, wherein said featureless images comprise defocused images of said view of interest.

6. The method according to claim 1, wherein said featureless images are obtained at incremental exposure times.

7. A method of generating an intrinsic imaging map of a view of interest, the method comprising:
    obtaining a first focused image of a view of interest at a first exposure time;
    obtaining a first plurality of featureless images of illumination intensities without discernible spatial features of said view of interest, wherein the featureless images of said first plurality of featureless images are obtained at different exposure times;
    obtaining a second focused image of said view of interest at a second exposure time different than said first exposure time;
    obtaining a second plurality of featureless images of illumination intensities without discernible spatial features of said view of interest, wherein the featureless images of said second plurality of featureless images are obtained at different exposure times;
    generating a first plurality of intrinsic images of said view of interest, wherein said first plurality of intrinsic images comprises a first intrinsic image generated from said first focused image and a first featureless image of said first plurality of featureless images and the rest of said first plurality of intrinsic images are individually generated from said first focused image and each of the rest of said featureless images of said first plurality of featureless images;
    generating a second plurality of intrinsic images of said view of interest, wherein said second plurality of intrinsic images comprises a first intrinsic image generated from said second focused image and a first featureless image of said second plurality of featureless images and the rest of said second plurality of intrinsic images are individually generated from said second focused image and each of the rest of said featureless images of said second plurality of featureless images; and
    generating an intrinsic imaging map of said view of interest, wherein said first plurality of intrinsic images and said second plurality of intrinsic images are arranged and shown in the form of a matrix.

8. The method according to claim 7, wherein said first featureless image of said plurality of featureless images is obtained at said first exposure time.

9. The method according to claim 7, wherein all focused images and all featureless images are obtained at the same ISO sensitivity.

10. The method according to claim 7, wherein all of said featureless images comprise diffused images of said view of interest.

11. The method according to claim 7, wherein all of said featureless images comprise defocused images of said view of interest.

12. The method according to claim 7, wherein all of said featureless images are obtained at incremental exposure times.

* * * * *